(12) United States Patent
Smith et al.

(10) Patent No.: US 7,032,715 B2
(45) Date of Patent: Apr. 25, 2006

(54) METHODS AND APPARATUS FOR ASSIGNING ELEVATOR HALL CALLS TO MINIMIZE ENERGY USE

(75) Inventors: Rory Smith, El Cajon, CA (US); Richard D. Peters, Great Kingshill (GB)

(73) Assignee: Thyssen Elevator Capital Corp., Whittier, CA (US)

( * ) Notice: Subject to any disclaimer, the term of this patent is extended or adjusted under 35 U.S.C. 154(b) by 62 days.

(21) Appl. No.: 10/615,429

(22) Filed: Jul. 7, 2003

(65) Prior Publication Data

US 2005/0006183 A1    Jan. 13, 2005

(51) Int. Cl.
 *B66B 1/16* (2006.01)
(52) U.S. Cl. .................................. 187/380; 187/247
(58) Field of Classification Search ................ 187/247, 187/248, 380–388; 706/13, 910, 902, 903, 706/918
See application file for complete search history.

(56) References Cited

U.S. PATENT DOCUMENTS

| | | | |
|---|---|---|---|
| 3,891,064 A | 6/1975 | Clark | |
| 4,402,387 A | 9/1983 | Tsuji et al. | |
| 5,932,852 A * | 8/1999 | Tyni et al. | 187/382 |
| 6,199,667 B1 | 3/2001 | Fischgold et al. | |
| 6,293,368 B1 * | 9/2001 | Ylinen et al. | 187/382 |
| 6,345,697 B1 * | 2/2002 | Siikonen | 187/382 |
| 6,439,349 B1 * | 8/2002 | Smith | 187/382 |
| 6,672,431 B1 * | 1/2004 | Brand et al. | 187/382 |
| 6,776,264 B1 * | 8/2004 | Tyni et al. | 187/382 |
| 2004/0060776 A1 * | 4/2004 | Tyni et al. | 187/380 |

OTHER PUBLICATIONS

Qun et al., Elevator World, Jun. 2002, pp. 105-110.

* cited by examiner

*Primary Examiner*—Jonathan Salata
(74) *Attorney, Agent, or Firm*—Frost Brown Todd LLC

(57) ABSTRACT

Energy saving methods and apparatus for elevator systems having a plurality of elevator cars operating in a plurality of elevator shafts. The present invention provides methods and apparatus for determining which one of the plurality of elevator cars is to be assigned to a new hall call in order to reduce the net energy consumption of the elevator system over time.

8 Claims, 2 Drawing Sheets

METHODS AND APPARATUS FOR ASSIGNING ELEVATOR HALL CALLS TO MINIMIZE ENERGY USE

FIELD OF THE INVENTION

Figure 1:
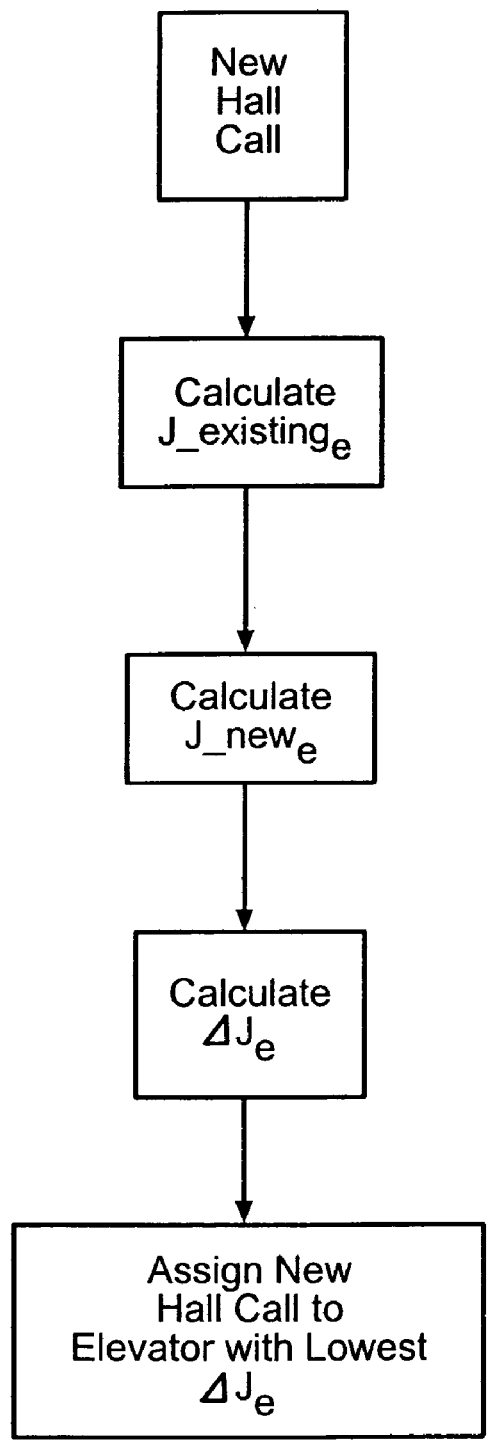

The present invention relates to energy saving methods and apparatus for elevator systems having a plurality of elevator cars operating in a plurality of elevator shafts.

BACKGROUND OF THE INVENTION

Existing hall call allocation systems attempt to find an optimum solution for assigning new hall calls to a group of elevator cars. Typically, the existing systems and methods use neural networks, genetic algorithms, and/or fuzzy logic to optimize hall call allocations based on criteria such as waiting time, time to destination, and elevator usage. These systems typically try to minimize waiting times. Some of the newer systems try to minimize average journey time. Journey time is the time from the entry of a hall call (or joining the queue if a previous passenger has entered a hall call) to arrival at the destination.

Several energy minimization systems have been proposed. U.S. Pat. No. 4,402,387 evaluates three elevator velocities and selects the one that uses the least amount of energy. U.S. Pat. Nos. 3,891,064 and 6,199,667 have the ability to select one of three velocity profiles depending on whether the goals are energy use or traffic handling. All of these patents make decisions about the elevator car's next trip. None of these three patents address a total dispatching system of energy minimization.

In view of the above, there is a need for a system that minimizes the total use of energy in lieu of minimizing waiting time or journey time when energy use is more important than traffic handling.

SUMMARY OF THE INVENTION

The invention provides a method of assigning hall calls to reduce the net energy expenditure in operating a bank of elevator cars. The method comprises the steps of: in response to a hall call to receive a passenger, for each of a plurality of elevator cars, the plurality being selected from the elevator cars in the bank, calculating the energy use to answer the call and deliver the passenger to a destination, wherein the destination is selected from the group consisting of an inferred destination and a preselected destination; and assigning the elevator car with the lowest calculated energy use to answer the hall call.

The invention also provides a method of assigning hall calls to reduce the net energy expenditure in operating a bank of elevator cars which comprises the steps of: assigning a threshold ratio value of energy saved per time increment; in response to a hall call to receive a passenger, for each of a plurality of elevator cars, the plurality being selected from the elevator cars in the bank, calculating the energy use to answer the call and deliver the passenger to a destination, wherein the destination is selected from the group consisting of an inferred destination and a preselected destination; for each available car, calculating the ratio of (i) the energy which would be saved by assigning that car to the call versus assigning the car with the shortest time to destination to the call to (ii) the extra time to destination which would result by assigning that car to the call versus assigning the car with the shortest time to destination; and assigning the elevator car with the lowest calculated energy use that also has an ratio of (i) to (ii) at or above the threshold ratio value to answer the hall call.

The invention also generally provides electronic circuitry for performing the methods of the invention, and computer systems and computer instructions stored in computer readable memory for performing the methods of the invention. Advantageously, apparatus which implement the method of the invention may provide for turning on and turning off implementation of the energy saving method in response to a command such as an external input, according to a programmed schedule, and/or according to time-cost energy-savings-benefit analysis criteria. The apparatus may also provide for modifying the cost benefit parameters/threshold values in a programmable manner, for example, according to a time and date schedule.

Figure 2:
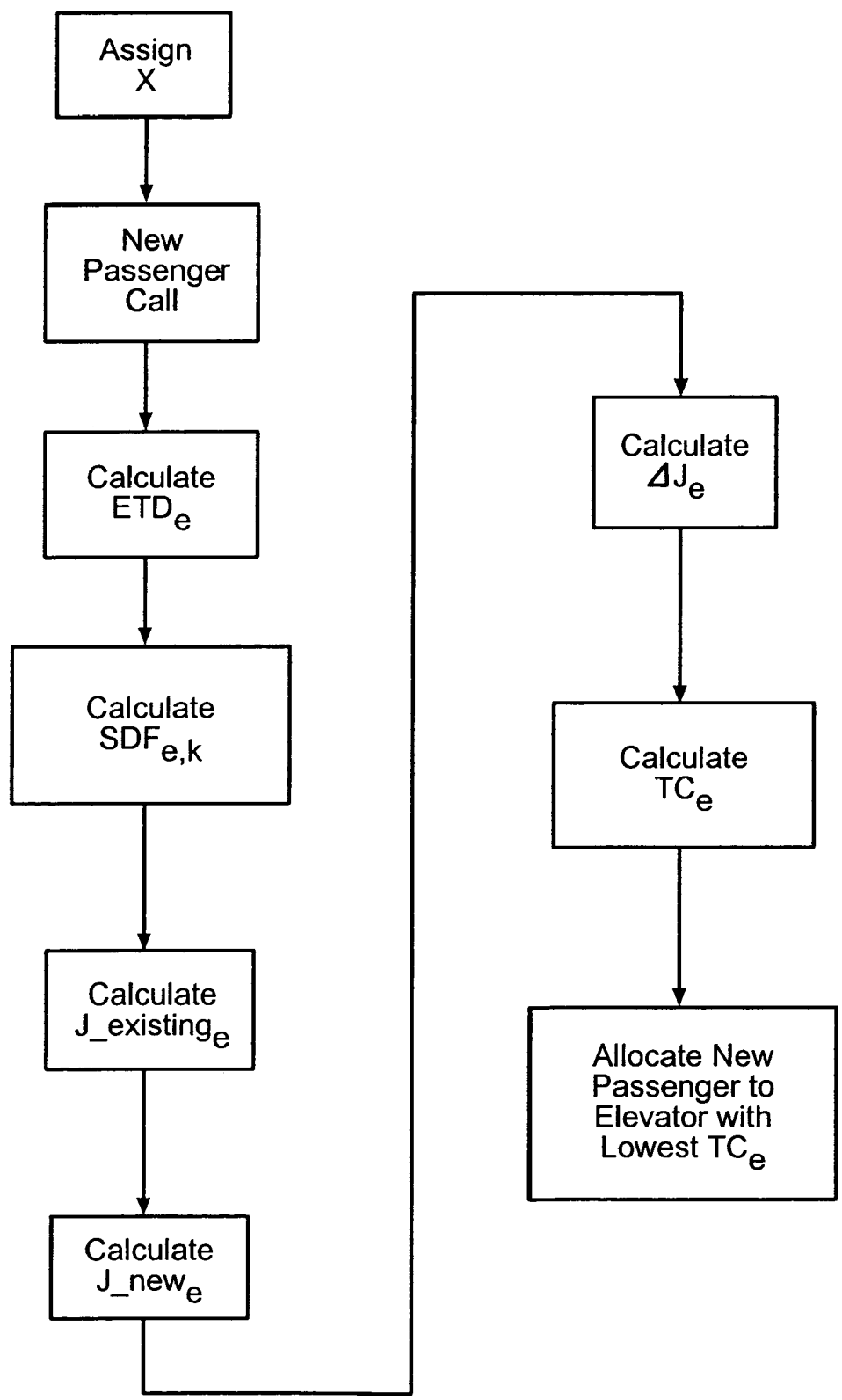

FIG. 1 is a flow chart of an energy savings method in accordance with the present invention; and FIG. 2 is a flow chart of another embodiment of an energy savings method in accordance with the present invention.

DETAILED DESCRIPTION

Referring to FIG. 1, according to one embodiment of the present invention, when a passenger executes a new hall call in an elevator system having a plurality of elevator cars that are available to answer the hail call, an inferred destination is assigned to the new hall call.

For each available elevator car e, the system estimates $J\_existing_e$, the energy it will require to serve its existing hall and car calls. The system then estimates $J\_new_e$, the energy it would require to serve existing calls, and in addition, the new hall call and inferred destination. The difference, $\Delta J_e$ is the additional energy required by the system if elevator e is to serve the new hall call and its inferred destination.

$$\Delta J_e = J\_new_e - J\_exisiting_e$$

$J\_new_e$ and $J\_exisiting_e$ are calculated by considering every trip the elevator needs to make until all the calls are answered. A motor model is used to determine the energy consumption of each trip. For example, if there are m trips to be made before all calls are answered, $$J\_new_e = \sum_{i=1}^{m} E_i$$

where $E_i$ is the energy consumed to complete the $i^{th}$ trip, including acceleration, travel at full speed (if reached) and deceleration.

The motor model considers the load of the elevator for each trip (for i=1 to m), which is inferred from:

1. the current load measured by a standard load sensing device;
2. the hall and car calls; and/or
3. historical traffic data that the system "learns" over time, thus providing estimates of the number and mass of people associated with each call.

If the elevator is currently moving, the calculation of $E_I$ is a special case, and determines the energy required to complete the current trip.

The new hall call is assigned to elevator with the lowest $\Delta J_e$. The lowest value may be negative.

One embodiment of the invention employs a standard hall call entry device, which typically comprises an up and down button. Another embodiment of the invention employs an external destination entry device. An external destination entry device may take many forms, as known in the art, and may be programmable. For example, the external destination entry device may comprise a processor, a visual display device, computer instructions stored in computer-readable memory for directing the processor(s) and visual display device, and an input device for allowing a passenger to select one or more available destinations. The computer instructions may be software and/or hardware based. The computer instructions may program the processor to display only those floors that are available as a destination. Electronic logic and control circuits as known in the art may be used for this purpose.

At times, it is advantageous to limit elevator stops to certain floors. The input device may also be programmed to allow only the inputting of available destinations. A computer touch screen is particularly well suited for use as both the visual display device and the input device.

In situations where the actual desired destination is known, for example, in systems employing external destination entry devices, the above described method for assigning hall calls can be further modified as:
1. the destination of the new call no longer needs to be inferred, as it is known; and
2. the inferred load for each trip can be determined more accurately as the number of people loading and unloading at each stop is known due to passengers entering their destinations at the landings.

According to the invention, where information about the number of people behind a hall call has been inferred but is not actually correct (more or fewer actual passengers), or if a destination entry call corresponds to more than one person, load-weighing devices detect the error when the passengers enter the car and correction to the inferred information is made so that subsequent calculations, for subsequent car assignments, are more correct.

Since the velocity profile of the elevator trip affects the energy consumed, $E_i$, it may be desirable to adjust the speed, acceleration and jerk for every trip. Prior art evaluated a limited number of speeds and velocity profiles. With modern microprocessor capabilities, a far larger range of velocities and profiles can be evaluated in real time. Additionally, copending U.S. patent application Ser. No. 10/113,517, which is hereby incorporated by reference in its entirety, describes a greater range of speeds that can be evaluated.

It is envisioned that this dispatching system can be used as a standalone system or incorporated as an enhancement to an existing dispatch equation. An example of incorporating this into an advanced dispatching system such as the one described in U.S. Pat. No. 6,439,349 B1, which is hereby incorporated by reference in its entirety, is as follows:

A new passenger arrives and registers a call. $ETD_e$ is the estimated time to destination, in seconds, of the new passenger if he or she were to use elevator e. It is calculated by determining the estimated time of arrival of elevator e at the landing where the new passenger is waiting, and then continuing to map the trip of the elevator forward in time until the passenger reaches his or her destination, taking into account all intermediate stops on the elevator's journey.

The system also calculates the System Degradation Factor of the allocation for every other passenger in the system. $SDF_{e,k}$ is the delay that the new passenger will cause to passenger k, in seconds, if the new passenger is allocated to the elevator e. $SDF_{e,k}$ is calculated by mapping out the journey of passenger k before and after the introduction of the new passenger into the system. $SDF_{e,k}$ is calculated for all passengers (n) currently waiting or traveling, excluding the passenger/call being assessed for allocation according to the invention. If no other passengers are waiting or traveling, aside from the passenger/call being assessed for allocation according to the invention, n equals zero.

The Total Cost of the allocation of the new passenger to elevator e is then the system degradation to all the other users of elevator e, plus the estimated time to destination for the new passenger. This can be written as follows:

$$TC_e = \text{if } n \geq 1 \sum_{k=1}^{n} SDF_{e,k} + ETD_e$$

The system allocates the new passenger to the elevator with the lowest total cost. If the system uses conventional hall call buttons in lieu of destination entry devices, the number of people behind each hall call and corresponding car calls are inferred.

To incorporate an energy saving component into this equation, the Total Cost equation is revised to:

$$TC_e = \left[ \text{if } n \geq 1 \sum_{k=1}^{n} SDF_{e,k} + ETD_e \right] + x[\Delta J_e]$$

where x is a cost benefit parameter defining the relative importance of passenger journey time versus energy consumption. The value of x may be fixed, controlled by an external input or programmable. For example, to turn off the energy saving equation, x may be set to zero. When load shedding is required, x may be set high.

It should be understood that the invention applies to any plurality of elevators cars selected from the total number of elevator cars of an elevator bank. Thus, for example, the methods of the invention may be employed to perform calculations and assignments based on every elevator car in a bank or only a subset of the elevator cars in a bank. In a related embodiment, the method is performed only with respect to available elevator cars in the bank. Here, inoperable cars, for example, are excluded. In another embodiment of the invention, the computer system or electronic circuitry which effectuates the method of the invention is programmable for the selection of elevators cars for which the method of the invention is to be employed.

Referring now to FIG. 2, it is envisioned that this dispatching system can be used as a standalone system or incorporated as an enhancement to an existing dispatch equation. An example of incorporating this into an advanced dispatching system such as the one described in U.S. Pat. No. 6,439,349 B1, which is hereby incorporated by reference in its entirety, is as follows:

What is claimed is:
1. A method of assigning hall calls to reduce the net energy expenditure in operating a bank of elevator cars, the method comprising the steps of:
assigning a threshold ratio value of energy saved per time delayed;
in response to a hall call to receive a passenger, for each of a plurality of elevator cars, the plurality being selected from the elevator cars in the bank, calculating the energy use to answer the call and deliver the passenger to a destination, wherein the destination is selected from the group consisting of an inferred destination and a preselected destination;

for each of the elevator cars of the plurality, calculating the ratio of (i) the energy which would be saved by assigning that car to the call versus assigning the car with the shortest time to destination to the call to (ii) the extra time to destination which would result by assigning that car to the call versus assigning the car with the shortest time to destination; and assigning the elevator car with the lowest calculated energy use that also has a ratio of (i) to (ii) at or above the threshold ratio value to answer the hall call.

2. A method of assigning hall calls to reduce the net energy expenditure in operating a bank of elevator cars, the method comprising the steps of:

in response to a hall call to receive a new passenger, for each of a plurality of elevator cars, the plurality being selected from the elevator cars in the bank, calculating the total cost ($TC_e$) to answer the call and deliver the passenger to a destination, wherein the destination is selected from the group consisting of an inferred destination and a preselected destination, and wherein the total cost ($TC_e$) is calculated according to the equation $$TC_e = \left[ \text{if } n \geq 1 \sum_{k=1}^{n} SDF_{e,k} + ETD_e \right] + x[\Delta J_e]$$

wherein $SDF_{e,k}$ is the delay that the new passenger will cause to passenger k if the new passenger is allocated to the elevator e, wherein $ETD_e$ is the estimated time to destination of the new passenger if the passenger were to use elevator e, wherein $\Delta J_e$ is the additional energy required by the system if elevator e is to serve the hall call of the new passenger and deliver the new passenger to the destination, wherein x is a preselected relative importance value defining the relative importance of passenger journey time versus energy consumption, and wherein there are n passengers traveling in the cars or waiting for a car in response to prior hall calls at the time allocation for the new passenger is being assessed, excluding the new passenger for which allocation is being assessed; and assigning the elevator car with the lowest total cost ($TC_e$) to answer the hall call.

3. The method according to claim 2, further comprising the step of assigning a value to x.

4. Computer readable memory comprising computer instructions directing at least one computer processor to perform the method according to claim 2.

5. A computer-implemented elevator control system comprising:

at least one computer processor; and computer readable memory comprising computer instructions directing the computer processor to perform the method according to claim 2.

6. The system according to claim 5, wherein the value of x is programmable or selectable.

7. Electronic logic circuitry configured to perform the method according to claim 2.

8. An electronic elevator control system comprising:

electronic logic circuitry configured to perform the method according to claim 7, wherein the value of x is programmable or selectable.

* * * * *

UNITED STATES PATENT AND TRADEMARK OFFICE
CERTIFICATE OF CORRECTION

| | |
|---|---|
| PATENT NO. | : 7,032,715 B2 |
| APPLICATION NO. | : 10/615429 |
| DATED | : April 25, 2006 |
| INVENTOR(S) | : Rory S. Smith et al. |

It is certified that error appears in the above-identified patent and that said Letters Patent is hereby corrected as shown below:

Column 2, Line 26, after, "...available to answer the" and before "call..." please remove "hail" and insert --hall--.

Signed and Sealed this

Seventh Day of November, 2006

JON W. DUDAS
*Director of the United States Patent and Trademark Office*